(12) United States Patent
Cerosaletti et al.

(10) Patent No.: US 8,117,210 B2
(45) Date of Patent: Feb. 14, 2012

(54) SAMPLING IMAGE RECORDS FROM A COLLECTION BASED ON A CHANGE METRIC

(75) Inventors: Cathleen D. Cerosaletti, Rochester, NY (US); Alexander C. Loui, Penfield, NY (US)

(73) Assignee: Eastman Kodak Company, Rochester, NJ (US)

( * ) Notice: Subject to any disclaimer, the term of this patent is extended or adjusted under 35 U.S.C. 154(b) by 830 days.

(21) Appl. No.: 11/772,854

(22) Filed: Jul. 3, 2007

(65) Prior Publication Data
US 2008/0085053 A1    Apr. 10, 2008

Related U.S. Application Data

(60) Provisional application No. 60/828,494, filed on Oct. 6, 2006.

(51) Int. Cl.
*G06F 7/00* (2006.01)
*G06F 17/30* (2006.01)

(52) U.S. Cl. .................. 707/749; 382/155; 382/159

(58) Field of Classification Search .............. 382/155, 382/159; 707/999.104, 999.002, 999.003, 707/999.005, 999.006, 737, 749, 707
See application file for complete search history.

(56) References Cited

U.S. PATENT DOCUMENTS

| | | | |
|---|---|---|---|
| 5,995,978 A | 11/1999 | Cullen et al. | 707/104 |
| 6,195,497 B1* | 2/2001 | Nagasaka et al. | 715/719 |
| 6,282,317 B1 | 8/2001 | Luo et al. | 382/203 |
| 6,351,556 B1 | 2/2002 | Loui et al. | 382/164 |
| 6,546,185 B1* | 4/2003 | Kim et al. | 715/719 |
| 6,606,411 B1 | 8/2003 | Loui et al. | 382/224 |
| 6,721,454 B1 | 4/2004 | Qian et al. | 382/224 |
| 6,748,158 B1* | 6/2004 | Jasinschi et al. | 707/E17.028 |
| 6,847,733 B2 | 1/2005 | Savakis et al. | 382/225 |
| 2003/0026594 A1 | 2/2003 | Shiiyama | 386/69 |
| 2004/0189691 A1 | 9/2004 | Jojic et al. | 345/720 |
| 2006/0126944 A1* | 6/2006 | Loui et al. | 382/224 |
| 2007/0071313 A1* | 3/2007 | Zhou et al. | 382/155 |

OTHER PUBLICATIONS

U.S. Appl. No. 11/403,583, filed Apr. 13, 2006, entitled Camera User Input Based Image Value Index by Manico, et al.
U.S. Appl. No. 11/403,686, filed Apr. 13, 2006, entitled Value Index From Incomplete Data by Fedorovskaya, et al.
U.S. Appl. No. 11/677,617, filed Feb. 22, 2007, entitled Representative Image Selection Based on Hierarchical Clustering by Blose, et al.

* cited by examiner

*Primary Examiner* — Vincent Boccio
(74) *Attorney, Agent, or Firm* — Justin D. Petruzzelli; Raymond L. Owens

(57) ABSTRACT

An image-record subject is identified for a plurality of image records in an image collection. Then, a sampling change-metric related to a changing characteristic of the image-record subject is identified, and sampling of at least a portion of the image collection occurs at least according to the sampling change-metric to obtain one or more image records for the subset. Information pertaining to results of the sampling step is stored in a computer-accessible memory system.

8 Claims, 11 Drawing Sheets

SAMPLING IMAGE RECORDS FROM A COLLECTION BASED ON A CHANGE METRIC

CROSS REFERENCE TO RELATED APPLICATION

This application claims the benefit of U.S. Provisional Application No. 60/828,494, filed Oct. 6, 2006, the entire disclosure of which is hereby incorporated herein by reference.

FIELD OF THE INVENTION

The invention relates to digital image record organization and management and more particularly relates to methods for sampling image records from a collection based on a change metric related to a changing characteristic of an image-record subject.

BACKGROUND OF THE INVENTION

Digital photographers capture image records with digital still cameras, video cameras, camera phones, and other random access digital capture devices. The captured record is initially stored on the capture device and is commonly then moved to personal computer disk memory or online storage systems. Whether the image records are stored on the device or on larger computer systems, the photographer can either manually or automatically organize their image records in a hierarchical fashion into digital content containers (typically called albums or folders). These containers can contain image records and other containers creating a hierarchical storage scheme. Organizing image records by real-life events, such as birthdays, holiday parties, and the like, is one of the most common organization methods used by digital photographers.

When searching and browsing hierarchical image record collections, digital capture devices, personal computer file systems, image organization applications, and online storage systems typically represent a collection of image records with an icon and/or a small-scaled image from the collection usually called a "thumbnail". The thumbnail image gives the user a view of one image from a potentially large collection of image records to assist them in recognizing the event and content of the collection and is advantageous for this purpose over an icon and collection name. The specific image record selected from the collection to represent the collection is sometimes referred to as a "key" image record. The same approach is utilized to provide representative images, also referred to as "key frames", of video image records.

Using the wide range of digital capture devices that are available, it is possible for a user to generate and store a sizable collection of image records in digital form. A number of solutions have been proposed for helping the user to sort and select images of most interest from a larger collection. Among these solutions are methods for classifying and grouping images according to event-based probabilistic criteria. For example, commonly assigned U.S. Pat. No. 6,606,411 entitled METHOD FOR AUTOMATICALLY CLASSIFYING IMAGES INTO EVENTS and U.S. Pat. No. 6,351,556 entitled METHOD FOR AUTOMATICALLY COMPARING CONTENT OF IMAGES FOR CLASSIFICATION INTO EVENTS both to Loui et al. disclose various event-based solutions for classifying and grouping image records.

Users tend to capture image records episodically, reflecting different occurrences. Grouping image records to reflect different episodes can be based on spatio-temporal differences, such as time or distance, or, in a more sophisticated manner, based upon event and subevent. These approaches tend to be convenient for many people, but have the shortcoming that the subject matter of the image records in groups and subgroups is not necessarily apparent from the grouping procedure. A representative image record can make the subject matter of a group or subgroup apparent, but is relatively difficult to determine. This is unlike groupings, in which all members necessarily have the same subject matter, such that a member of a group is representative of the group. For example, any member of the group "pictures of the new baby" would be capable of representing the group as a picture of the new baby.

Many systems use the first image record in a set of image records as a representative image record. The first image record is typically chronologically the earliest. The selection of the first image record often does not adequately reflect the context or content of the other image records in the set. For example, many digital photographers capture content before an actual event begins simply to verify camera operation. The content captured for this purpose is arbitrary and may or may not reflect the content captured during the actual event. Actual event content captured at the beginning of a lengthy event also frequently does not accurately reflect the context and setting of the entire event.

U.S. Pat. No. 6,847,733 to Savakis et al. discloses a method in which images are grouped and representative images of the groups are determined based upon an understanding of the content (semantic saliency features) in the images. U.S. Pat. No. 6,721,454 to Qian et al. discloses a method in which video sequences are analyzed to determine semantic and other saliency features that are then summarized in textual descriptions.

While a number of methods for automated image classification and grouping have been developed, however, the task of selecting image records from the larger collection is inherently more difficult. Using a simple event-based model, a subset of image records can be obtained from a larger collection by taking a representative image record from each event-based grouping, for example. However, this type of selection would not be appropriate for a number of situations in which a user may want to obtain, from a large collection of image records, a small subset of image records of a subject of interest according to a temporal sequence. Thus, for example, a user may want to obtain, from a large image-record collection, a subset of image records that show significant stages or events in the life of a friend or family member. Conventional methods for automated selection of a subset of image records from the full collection could identify events with some granularity; however, there are some periods in the person's life that are generally of more interest than others. With a family member, for example, image records from childhood may be of considerable interest, whereas image records taken during adulthood may be of less interest.

Thus, it can be appreciated that a need in the art exists for improved or additional image-record-selection techniques.

SUMMARY

The above-described problems are addressed and a technical solution is achieved in the art by systems and methods for sampling image records from a collection based on a change metric, according to various embodiments of the present invention. In some embodiments of the present invention, an image-record subject is identified for a plurality of image records in an image collection. Then, a sampling change-metric related to a changing characteristic of the image-record subject is identified, and sampling of at least a portion of the image collection occurs at least according to the sampling change-metric to obtain one or more image records for the subset. Information pertaining to results of the sampling step is stored in a computer-accessible memory system.

By sampling according to the change-metric, a sampling frequency can be adjusted based upon rates-of-change of the characteristic of the image-record subject. For example, these embodiments of the present invention allow sampling frequency to be directly proportional to the rates-of-change of the characteristic. To elaborate, if the image-record subject is a person, and the change metric is a growth curve of the subject, sampling frequency may be high when the person is a child and the growth curve exhibits a large slope (i.e., a high rate-of-change). On the other hand, as the person matures and the growth curve's slope flattens, sampling frequency may decrease. Accordingly, these embodiments of the invention allow users to easily sample an image-record collection in a manner that focuses on periods in an image-record-subject's life that exhibit a high rate of change for a particular characteristic of the users' choice. These periods of the image-record-subject's life often are periods of high-interest to the users.

To further increase the effectiveness and flexibility of embodiments of the present invention, any sampling technique, known in the art, may be used in conjunction with the change-metric-based sampling techniques of the various embodiments of the present invention. For example, a change-metric-based sampling technique according to an embodiment of the present invention may be used in conjunction with a conventional event-based sampling technique so that regions in an image-record-subject's life that do not experience a high-rate-of change of a characteristic may still be represented in a sampled subset of image records by the event-based sampling technique. To elaborate, if an image-record-subject is a person and the change metric is a growth curve, the change-metric-based sampling may sample more records from a collection when the person is in childhood than the event-based sampling technique. On the other hand, when the person is an adult, the change-based sampling technique may sample fewer records than the event-based sampling technique, which may sample records corresponding to important birthdays, like the person's $30^{th}$, $40^{th}$, and $50^{th}$, etc. birthdays.

Some embodiments of the present invention use a change-metric-based approach to cluster, or group, image-records in a collection or a sampled-subset of image records. For example, image records located substantially contiguously in time and having an associated high-rate of change (i.e., a high slope) on the change metric, may be organized into a group.

In this regard, the change-metric-based sampling techniques, the change-metric-based clustering techniques, or both the change-metric-based sampling techniques and the change-metric-based clustering techniques of embodiments of the present invention may be used in conjunction with any image-record-clustering technique known in the art.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

Figure 1:
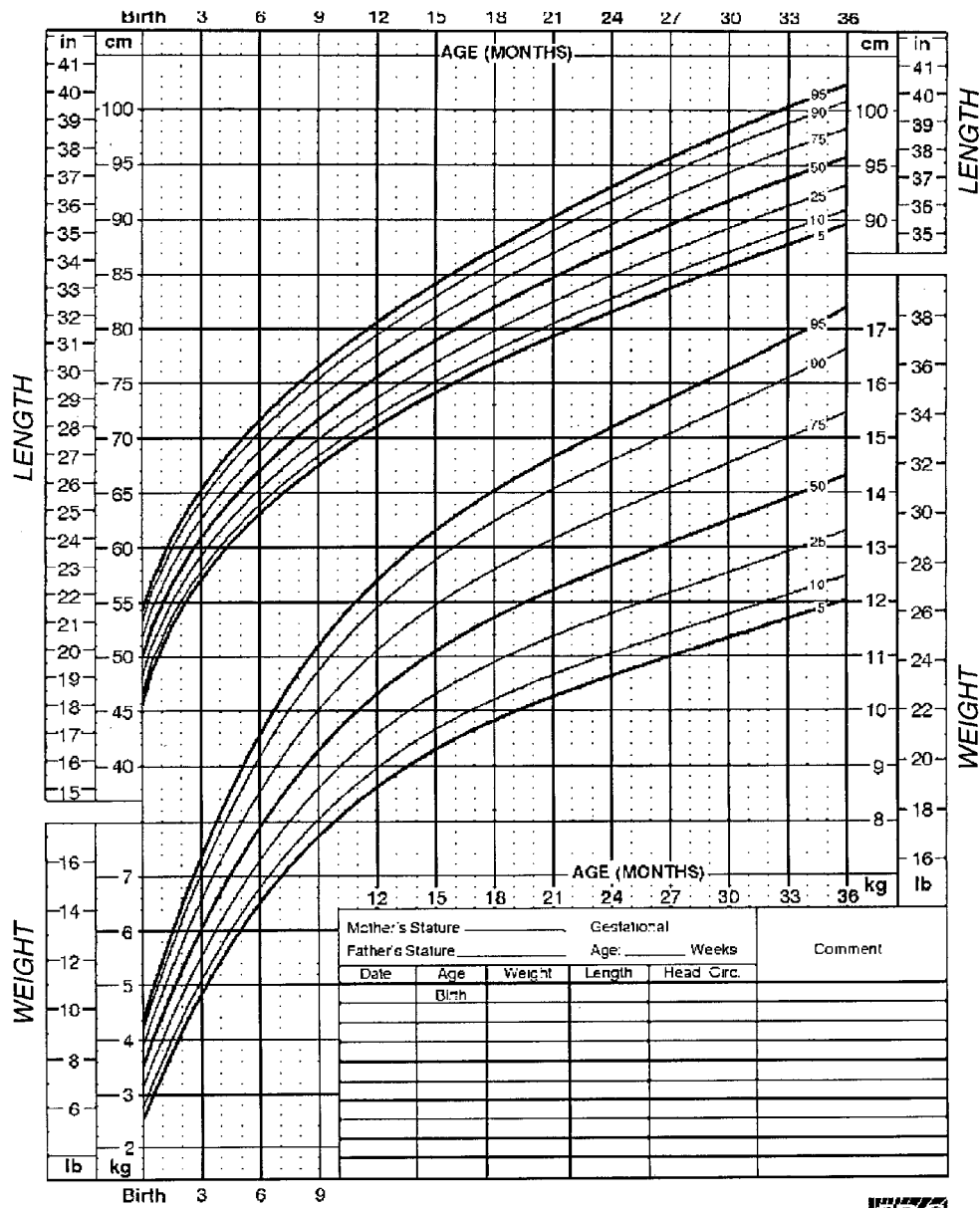
FIG. 1 is a graph showing an exemplary change metric for child growth rate.

It is to be understood that the attached drawings are for purposes of illustrating the concepts of the invention and may not be to scale.

DETAILED DESCRIPTION

As described earlier in the background section, the proliferation of digital cameras and scanners has lead to an explosion in the number of digital images and videos, creating image and video databases that can be inefficient to browse and search. Either algorithmic tools or a significant time investment by the user are required in order to provide a meaningful search system. In response to this need, embodiments of the present invention provide techniques for sampling a collection of images in manners that take into account factors such as changes or development in an image-record subject over time.

It should be noted that the phrase "image record" is used herein to refer to a digital still image, a video sequence, or any multimedia record. An image record may include metadata, such as sounds or textual annotations. A particular image record can be a single digital file or multiple, but associated, digital files. Metadata can be stored in the same image file as the associated digital image or can be stored separately. Other examples of image records include multiple spectrum images, scannerless range images, digital album pages, and multimedia video presentations. With a video sequence, the sequence of images may be a single image record. However, each of the images in a video sequence may alternatively be treated as a separate image record. Discussion herein is generally directed to image records that are captured using a digital camera. However, one skilled in the art will appreciate that the invention is not limited to any particular image-record capture device.

The term "subset" in the context of the present disclosure has its conventional meaning as a grouping of some, but not all, of the elements from a larger set, which can be termed a "superset". More formally, the term subset can be considered to be a non-empty proper subset of an image collection, not containing all of the members of the collection.

In addition, it should be noted that, unless otherwise explicitly noted or required by context, the word "or" is used in this disclosure in a non-exclusive sense.

Functions described here may be implemented as "software" or "software programs". Those skilled in the art will recognize, however, that the equivalent functions of such software can also be readily executed in hardware. Because image manipulation algorithms and systems are well known, the present description emphasizes algorithms and features forming part of, or cooperating more directly with, the method. General features of the types of computerized systems discussed herein are well known, and the present description is generally limited to those aspects directly related to methods according to embodiments of the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth herein, all additional software/hardware implementation is conventional and within the ordinary skill in the art.

System Hardware

Figure 10:
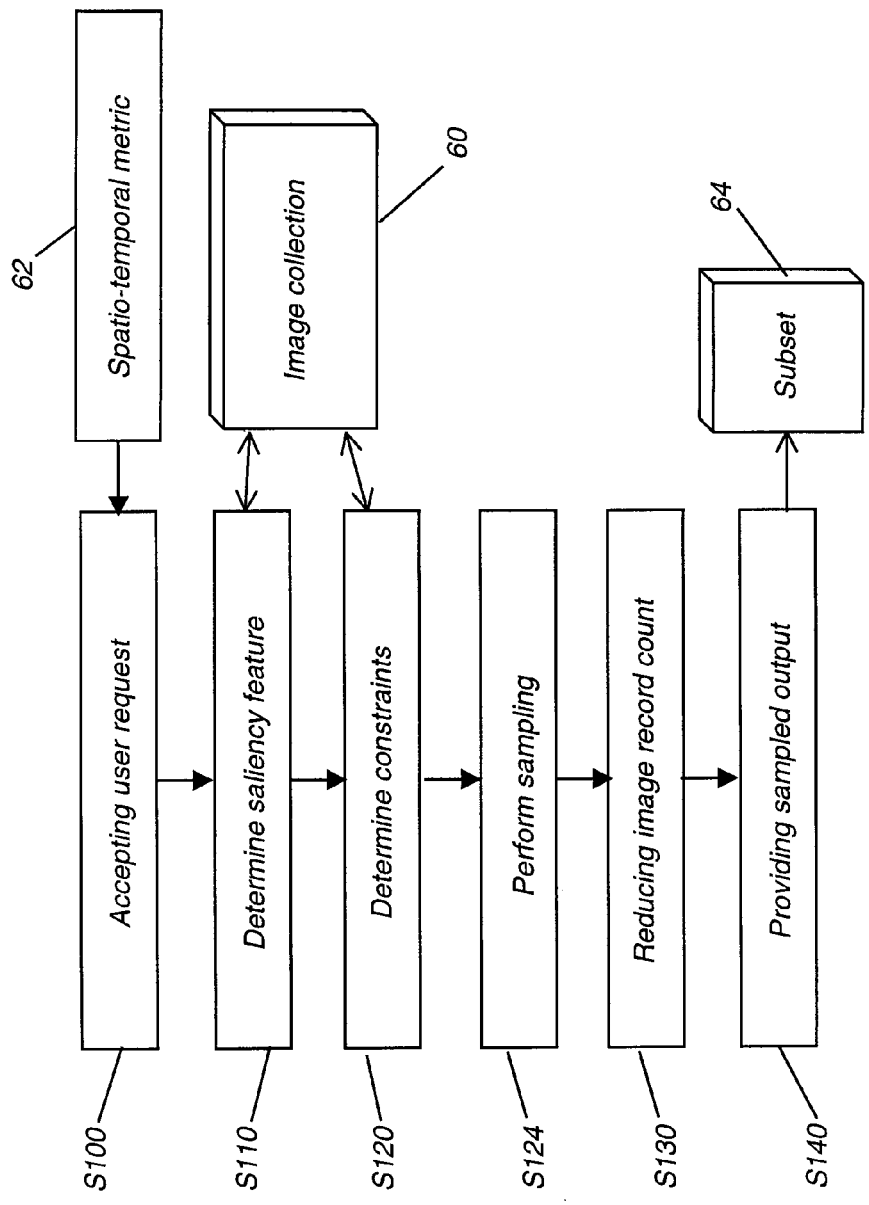
FIG. 10 is a logic flow diagram of an embodiment applying saliency feature and constraint conditions to the sampling process, according to an embodiment of the present invention.
Figure 11:
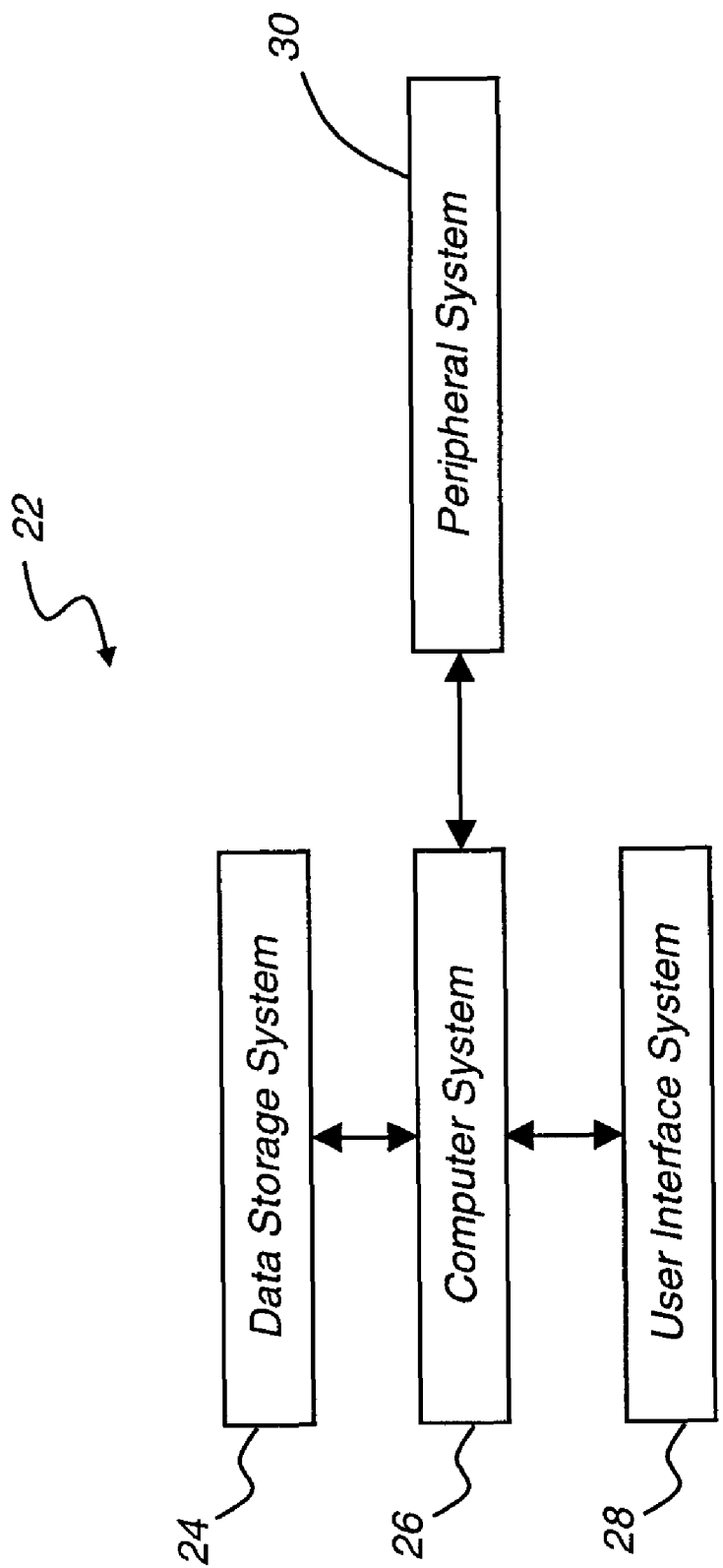
FIG. 11 is a schematic block diagram showing a system, according to an embodiment of the present invention, for executing the processes of various embodiments of the present invention.

FIG. 11 illustrates a system for sampling image records from a collection based on a change metric, according to an embodiment of the present invention. The system 22 includes a computer system 26, a peripheral system 30, a user interface system 28, and a data storage system 24. The data storage system 24, the peripheral system 30, and the user interface system 28 are communicatively connected to the computer system 26. The computer system 26 includes one or more computers that implement the processes of the various embodiments of the present invention, including the example processes of FIGS. 6-10 described herein.

The term "computer" is intended to be a synonym for or include any data processing device, such as a central processing unit ("CPU"), a desktop computer, a laptop computer, a mainframe computer, a personal digital assistant, a Blackberry™, a digital camera, or any other device for processing data, managing data, or handling data, whether implemented with electrical, magnetic, optical, biological components, or otherwise.

The data storage system 24 includes one or more computer-accessible memories configured to store the information needed to execute the processes of the various embodiments of the present invention, including the example processes of FIGS. 6-10 described herein. The data storage system 24 may be a distributed data storage system including multiple computer-accessible memories communicatively connected to the computer system 26 via a plurality of computers and/or devices. On the other hand, the data storage system 24 need not be a distributed data-storage system and, consequently, may include one or more computer-accessible memories located within a single computer or device.

The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected" is intended to include any type of connection, whether wired or wireless, between devices, computers, or programs in which data may be communicated. Further, the phrase "communicatively connected" is intended to include a connection between devices or programs within a single computer, a connection between devices or programs located in different computers, and a connection between devices not located in computers at all. In this regard, although the data storage system 24 is shown separately from the computer system 26, one skilled in the art will appreciate that the data storage system 24 may be stored completely or partially within the computer system 26. Further in this regard, although the peripheral system 30 and the user interface system 28 are shown separately from the computer system 26, one skilled in the art will appreciate that one or both of such systems may be stored completely or partially within the computer system 26.

The peripheral system 30 may include one or more devices configured to provide image records to the computer system 26. For example, the peripheral system 30 may include digital video cameras, cellular phones, regular digital cameras, or other computers. The computer system 26, upon receipt of image records from a device in the peripheral system 30, may store such image records in the data storage system 24.

The user interface system 28 may include a mouse, a keyboard, another computer, or any device or combination of devices from which data is input to the computer system 26. In this regard, although the peripheral system 30 is shown separately from the user interface system 28, the peripheral system 30 may be included as part of the user interface system 28.

The user interface system 28 also may include a display device, a computer-accessible memory, a display device and a computer accessible memory, or any device or combination of devices to which data is output by the computer system 26. In this regard, if the user interface system 28 includes a computer-accessible memory, such memory may be part of the data storage system 24 even though the user interface system 28 and the data storage system 24 are shown separately in FIG. 11.

Image Metadata

Image records stored in an image-record collection in the data storage system 24 may be linked to a variable amount of metadata. This image metadata can include various semantic and structural information related to the conditions under which the image was captured as well as information obtained about image contents. By way of illustration, metadata for an image can include date and time of image capture, the capture location (provided by a Global Positioning Satellite, GPS, for example), camera owner, camera type, image resolution, comments from the operator or viewer of the image, and various data obtained from the image content itself, including information identifying the subject(s) of the image, for example.

Using image metadata, images can be sampled to form a subset, then grouped or clustered within the subset in various ways. Groups of images, in turn, can have related tags or other metadata. The relative significance to the user of groupings of images and videos can be related to parameters that manipulate the number of images in each group and the number of groups to be formed. These parameters could be automatically or semi-automatically adjusted based on image and image-metadata characteristics, on image meaning, on user needs while using a device, and on other device constraints.

Image grouping parameters can be algorithmically determined by utilizing image and image-metadata characteristics, image meaning, user needs while using a device, and other device constraints. Users could tag or annotate image groups for later retrieval. Based on the type of project the user has selected to create, a different image time-sampling function can be appropriate. In response to this need, embodiments of the present invention describe methods for obtaining a group of images based on image meaning and user needs and change criteria related to the image-record subject, and taking into account device-related constraints and other less semantically relevant variables.

Methods according to some embodiments of the present invention address the task of executing retrieval queries based on the output goals of the user and considering variables that have not previously been addressed using conventional image sampling approaches.

Use of a Change Metric for Sampling

One feature of embodiments of the present invention relates to the use of a change metric as a factor in the image sampling process. Change metrics are well known in the statistical arts. Illustrative examples of change metrics from a health data collection agency are shown in FIG. 1. Curves in this example show standard values for a child's weight and height, over time, for the first three years of life. As is well known, change in both height and weight attributes is more pronounced over the first few months, then begins to slow over the next several months. In general, embodiments of the present invention may utilize change metrics of this or of some other type as a factor that affects sampling frequency for digital images.

In one example, a user may want to create a scrapbook that illustrates the change and development of a particular person over time. For example, a user may want to generate a kindergarten scrapbook or to collect images for a display board as a memorial. Contrasting the necessary sampling functions for these two different applications, it can be appreciated that these sampling functions would vary in sampling frequency over time. For example, as described with reference to FIG. 1, a child changes rapidly between ages 0-5 years and even more quickly between ages 0-2 years. The sampling frequency during maturation could be higher due to this fact. Sampling frequency relative to an adult could be much different, based more on events, with longer intervals between sampling, except where events occur. Thus, the appropriate sampling sequence for obtaining images over a person's lifetime generally would appear to be nonlinear and, in some embodiments of the present invention, may be required to handle these two factors: sampling criteria using a change metric related to a changing characteristic of an image-record subject that tends to vary with time in a non-linear fashion, and another type of sampling technique, such as an event-based sampling technique, that may be related only indirectly to passage of time over any specific interval. In practice, it has been found that an optimized sampling function for an entire lifetime can be highly discontinuous according to these factors, yielding a nonlinear change-based relationship for at least a portion of the images obtained in sampling.

Figure 2:
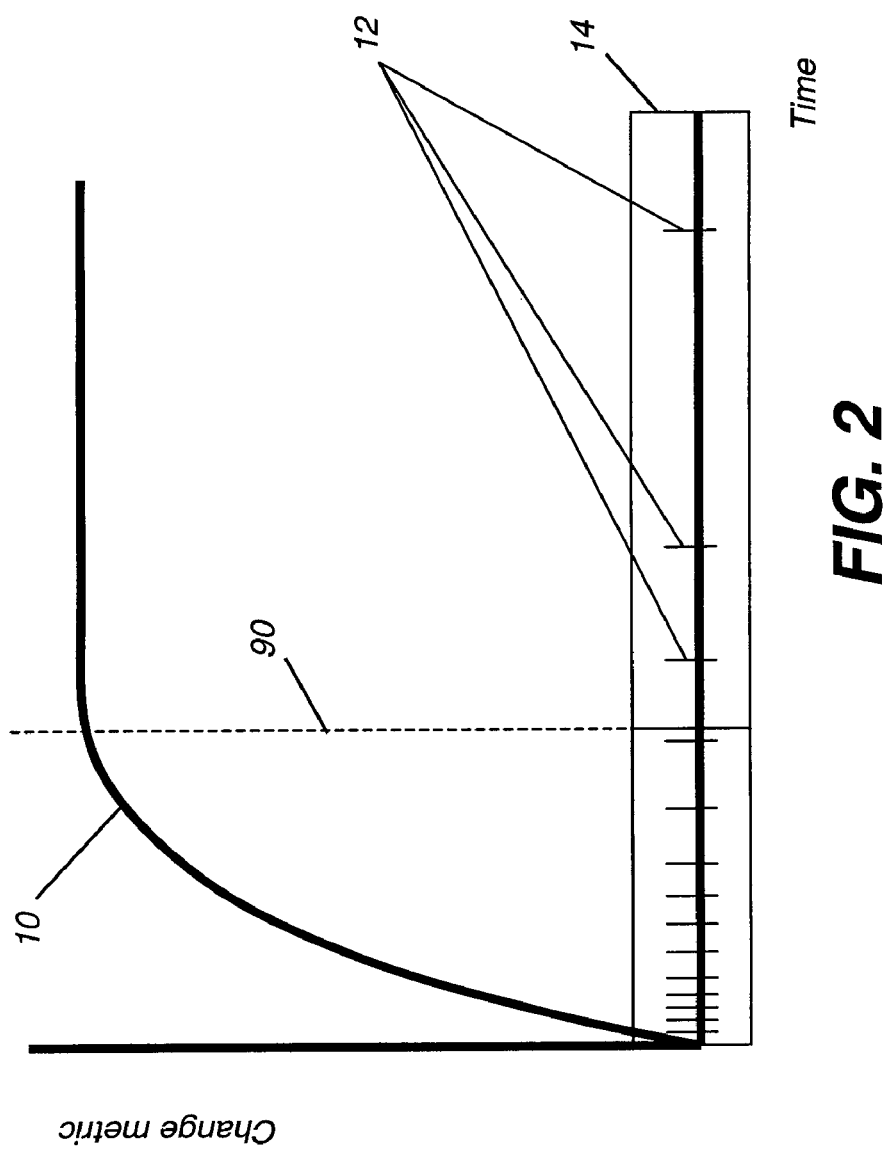
FIG. 2 is a graph showing the relationship of a predetermined change metric over time and relation to the sampling rate, according to an embodiment of the present invention.

Applying this principle, it can be seen that a change metric of some type might indeed vary with time and may impact a sampling sequence accordingly. Referring to FIG. 2, there is shown a representative graph for sampling images obtained over a period of time using a change metric. A curve 10 represents a measurable variable, such as might be part of image metadata, where the variable is known to change with time. Where the image-record subject is a person, for example, curve 10 may simply indicate the person's relative physical maturity. Alternately, some variable such as height, weight, facial change, or other variable may be used as the change metric. In the example of FIG. 2, sampling is performed as indicated at the indicated image records 12. A box 14 indicates the set of image records 12 that are obtained based on the relative rate of change of the change metric. Where curve 10 is steeply sloped, there is a high rate of change, and image records 12 are obtained at a higher frequency. Then, as curve 10 becomes less steeply sloped, image records 12 are obtained over longer intervals.

The relationship shown in FIG. 2 is well-suited to sampling images when an image collection spans the years of a person's life. Up until adolescence or adulthood, indicated by an arbitrary dashed line 90, a high rate of change in the change metric relates to a higher sampling rate than is used once adulthood is achieved. Thus, for example, images are sampled over small intervals when the person is a child, aged 0-5 years. As the subject ages, images can be sampled over progressively longer intervals. As is noted in FIG. 2, after a certain time (here, at dotted line 90), the change metric may no longer be a significant factor for sampling, as indicated by a flat portion (zero slope) as the curve progresses toward the right.

Figure 3:
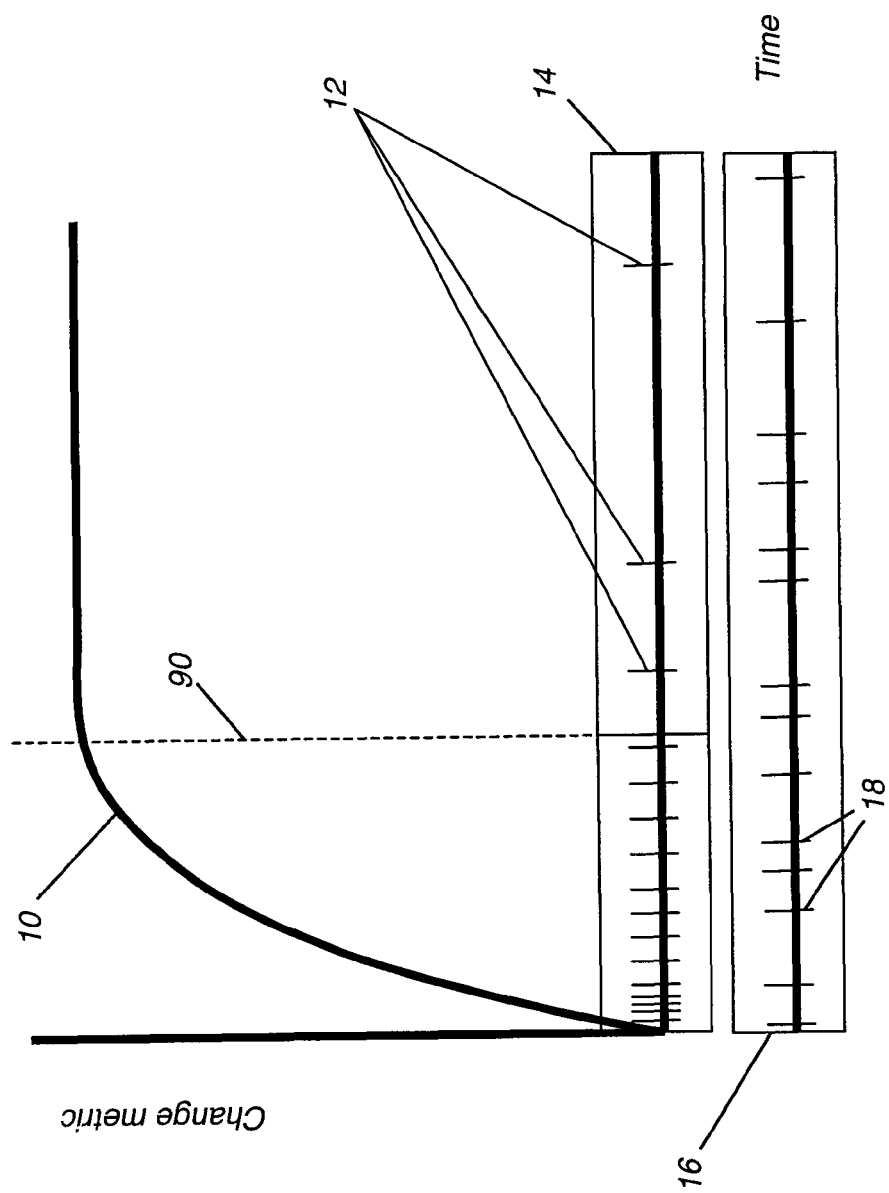
FIG. 3 is a graph similar to that in FIG. 1 and expanded to show the added affect of sampling based on events, according to an embodiment of the present invention.

It can be noted that a change metric would not be the only valid criterion applied to images taken of a human subject over a longer period of time. Other criteria, such as events, may also be of significance and can be combined with one or more change metrics for sampling. The graph of FIG. 3 shows how both a change metric and an event-based approach can cooperate in order to sample images from a collection. A box 16 shows the time sequence of image records 18 taken using event detection. Event detection for grouping images in a collection can be executed in a number of ways, such as those disclosed in commonly assigned U.S. Pat. No. 6,606,411 entitled "METHOD FOR AUTOMATICALLY CLASSIFYING IMAGES INTO EVENTS"; U.S. Pat. No. 6,351,556 entitled "METHOD FOR AUTOMATICALLY COMPARING CONTENT OF IMAGES FOR CLASSIFICATION INTO EVENTS"; and U.S. Patent Application Publication No. 2006/0126944 entitled "VARIANCE-BASED EVENT CLUSTERING", all to Loui et al., the disclosures of which are incorporated herein by reference. As FIG. 3 shows, event detection can cover the same time period over which a change metric is used, but its sampling frequency is not necessarily related directly to the change metric. Thus, a combination employing both the change metric and event-based approaches can be used for sampling an image collection. Moreover, other sampling techniques could be used in combination with the change metric to provide an enhanced sampling method.

Use of the Change Metric for Clustering

As noted earlier, the change metric may not only be used as a potential factor for sampling in order to obtain a subset of image records from an image collection, the same change metric, or some other suitable change metric, can also be applied as a factor for clustering image records within the subset. Specification of a particular change metric for any sampling or clustering operation can be made based on the subject of the obtained image records. For a child, for example, a suitable change metric that relates to growth and/or development of the child would be appropriate. Growth curves, such as those shown in the example of FIG. 1, are particularly useful candidates for the change metric. Other types of change metric could also be used.

Figure 4:
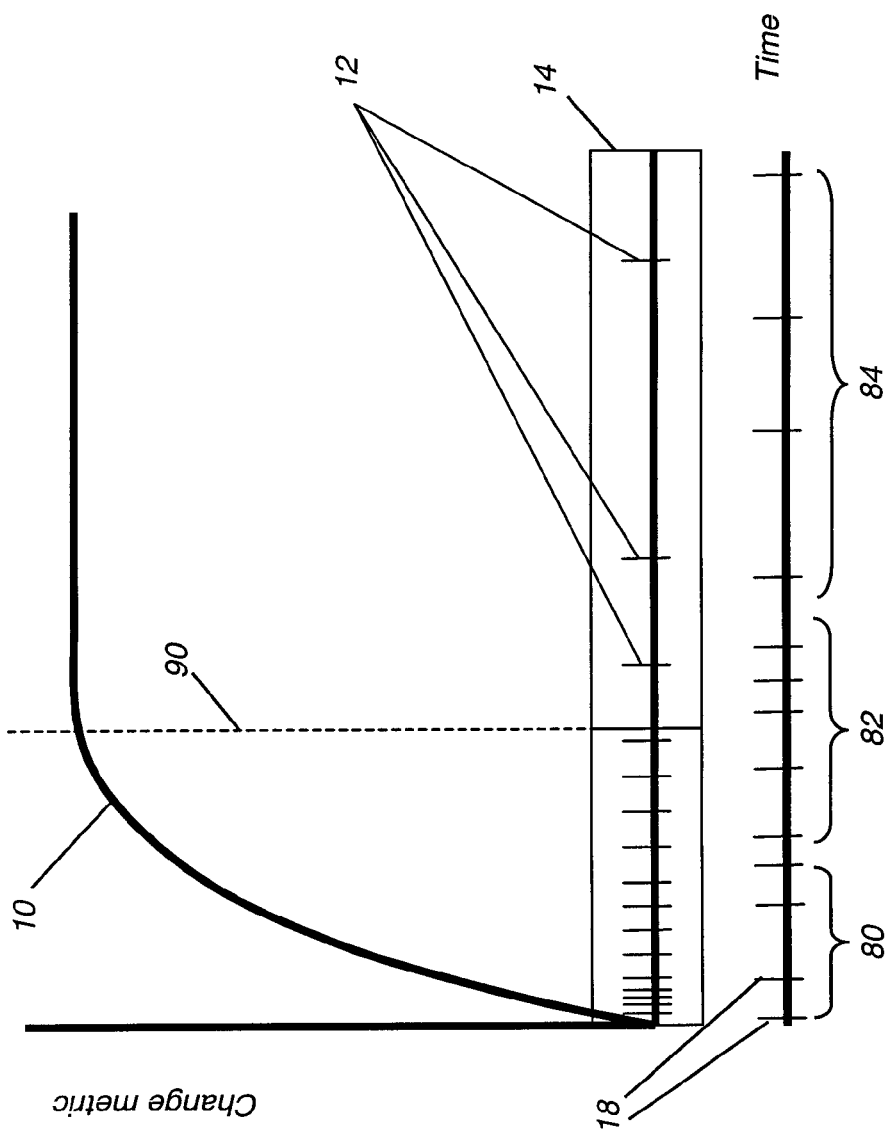
FIG. 4 is a graph similar to that in FIG. 1 and expanded to show grouping performed on a sampled subset of images, according to an embodiment of the present invention.

The graph of FIG. 4 shows clustering for forming groups 80, 82, and 84 of image records from the image subset that has been obtained from sampling of the superset of image records. The control logic used for clustering can use any of a number of methods, including the use of a change metric. In an example using a change metric for clustering, referred to herein as a "clustering change metric", the image records in group 80 may be joined because they were captured in a substantially contiguous block of time and exhibit similar change-metric slope (i.e., rate-of-change) characteristics. The image records in groups 82 and 84 may be respectively joined for the same reasons.

Sampling and Clustering Granularity

One factor with impact on both sampling and clustering is granularity. Granularity relates to resolution and is at least coarsely related to the size of the sampled image set or the number of groupings formed from image records within the set. "Sampling granularity" affects the overall number of image records that are in the subset that is obtained in sampling. "Clustering granularity" affects how many groupings of image records are formed using the sampled subset of image records.

Figure 5:
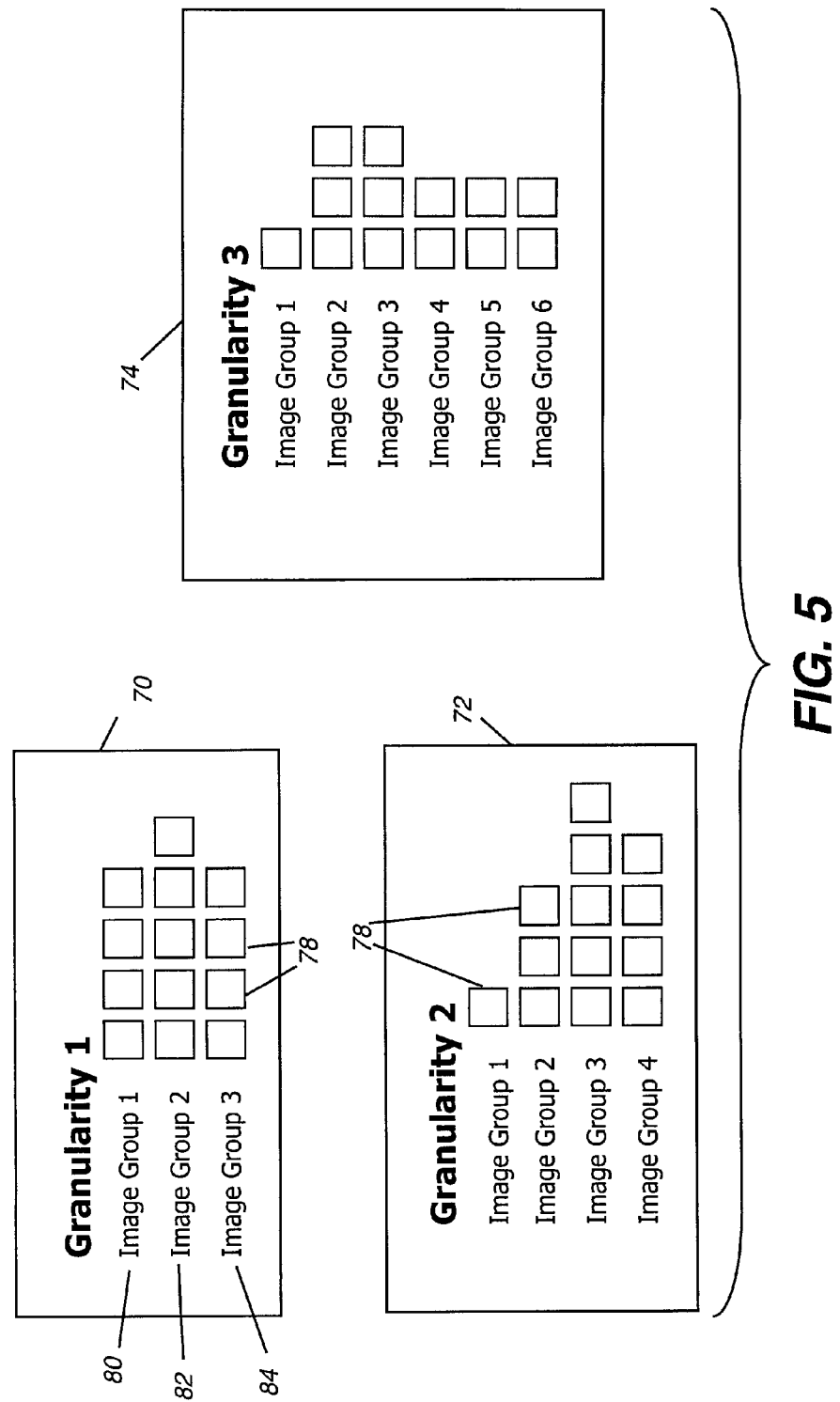
FIG. 5 is a block diagram showing results using different granularity settings, according to an embodiment of the present invention.

FIG. 5 illustrates what happens to a single subset of images retrieved from a collection of image records when different clustering granularity settings are applied to such subset. In particular, in the example of FIG. 5, a particular sampling granularity causes thirteen image records 78 to be retrieved from an image record collection. These thirteen image records 78 are organized into different numbers of groups based upon what clustering granularity setting is used to organize them. Each box 70, 72, and 74 illustrates a result of a clustering operation performed on the subset of thirteen image records 78 using a different clustering granularity setting. In this regard, boxes 70, 72, and 74 illustrate that different clustering granularity settings result in different numbers of image-record groups.

In particular, a relatively low clustering granularity setting causes the image record subset of thirteen image records to have three groups, numbered 80, 82, and 84, respectively, as shown in box 70. A middle clustering granularity setting, in this example, causes the image record subset of thirteen image records to have four groups, as shown in box 72. A relatively high clustering granularity setting, in this example, causes the image record subset of thirteen image records to be organized into six groups, as shown in box 74. In general, the higher the granularity setting for a sampling operation, the greater the number of image groups that would be sampled. Granularity settings can be determined by a user when initiating a sampling or grouping operation. Alternately, granularity settings may be default system settings or configurable parameters.

Sampling Sequence

Figure 6:
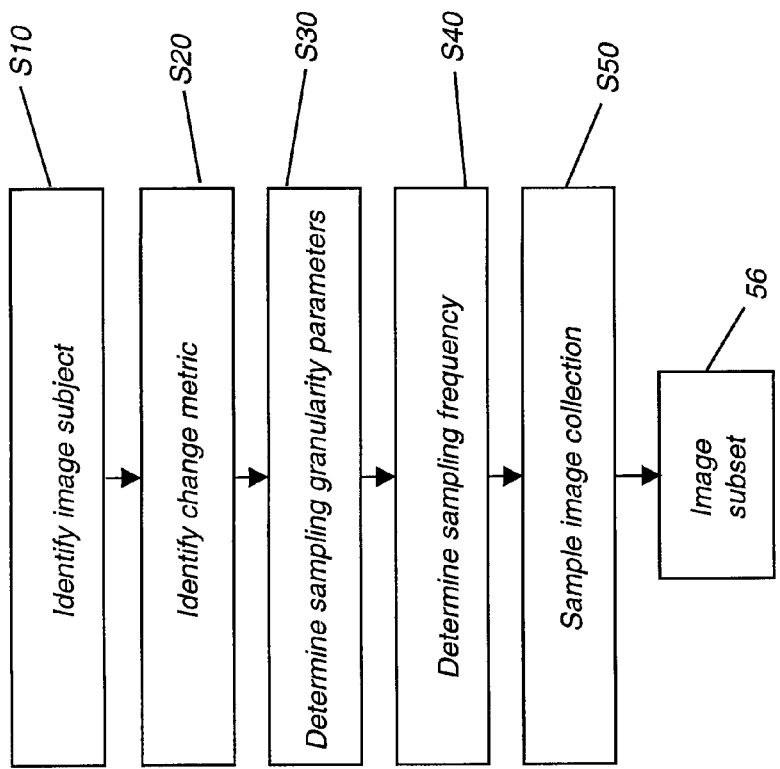
FIG. 6 is a logic flow diagram showing steps for sampling an image collection, according to an embodiment of the present invention.

The logic flow diagram of FIG. 6 shows a basic sampling sequence for forming a subset of image records from a larger image record collection, according to an embodiment of the present invention. In an identification step S10, an image-record subject is identified. For the examples described in the present disclosure, the image-record subject is a person. However, more generally, the image-record subject can be an animal, plant, or any object, such as a building under construction or other structure for which change of a subject-characteristic over time is of interest in generating a representative subset of image records.

In a step S20, a sampling change metric is identified. As was described with reference to FIGS. 1 and 2, the sampling change metric for a person may be growth, height, weight, or other characteristic. The rate of change of this sampling change metric can then be used as a factor in determining the changing sampling rate relative to time.

A step S30 determines sampling granularity parameters that influence the sampling frequency. Various parameters can be used for setting sampling granularity, including a limit on the number of image records in the subset or the relative size of image records, for example. Alternately, limits could be imposed on the type(s) of image records obtained. These factors are used in a step S40 during which the sampling frequency is computed. The collection is then sampled as part of a sampling step S50 to provide the subset of image records.

Figure 7:
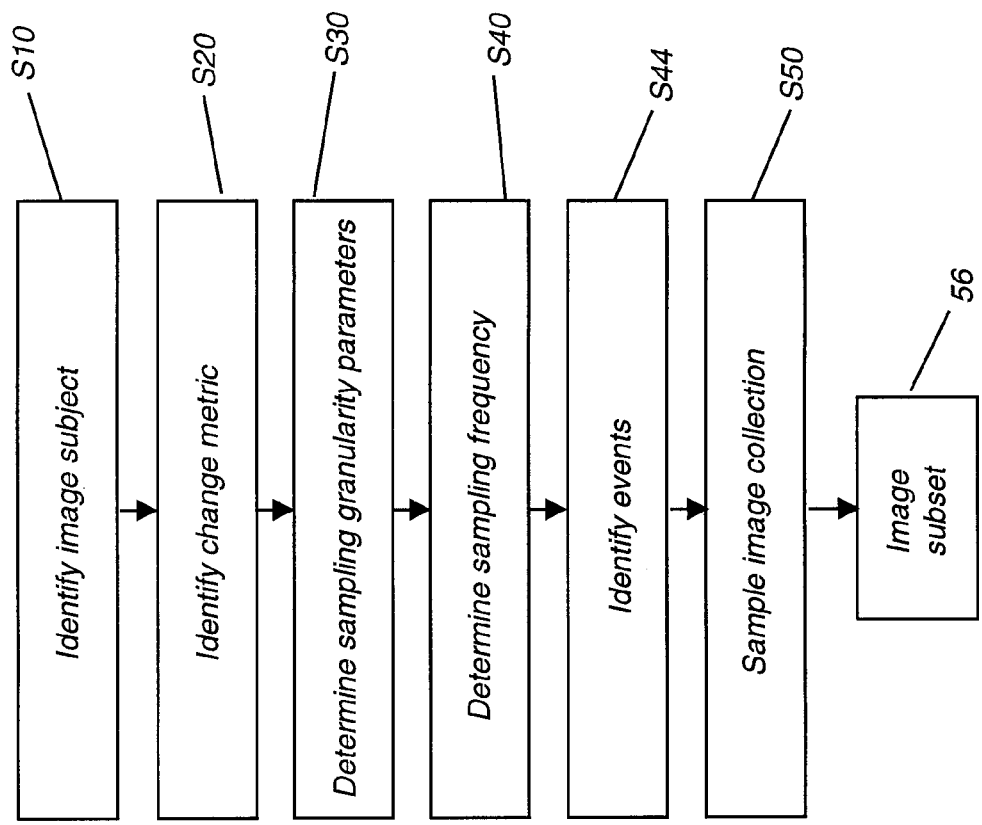
FIG. 7 is a logic flow diagram showing steps for sampling using both a growth metric and event detection logic, according to an embodiment of the present invention.

The sequence shown in FIG. 6 shows an embodiment where only the sampling change metric is used as a factor for sampling the collection to form an image record subset 56. The logic flow diagram of FIG. 7 shows an added step S44 for identifying events used as sampling criteria, in addition to the sampling change metric of FIG. 5. This combination, taking into consideration change and development over time as well as identifiable events, provides a rich technique for sampling the image collection.

It should be emphasized that other sampling techniques, instead of event-based-sampling techniques, may be combined with those that employ a change metric. Moreover, different subsets of image records may be generated from a single collection using different sampling sequences. In this way, for example, change metric sampling could be used on a superset of image records in order to form a first subset of image records as described earlier. Then, another sampling method or methods could be employed on the remaining image records in the superset of image records to generate a second subset of image records. Alternately, the results of the two different sampling methods could be combined for forming a single subset of image records.

Clustering Sequence

Figure 8:
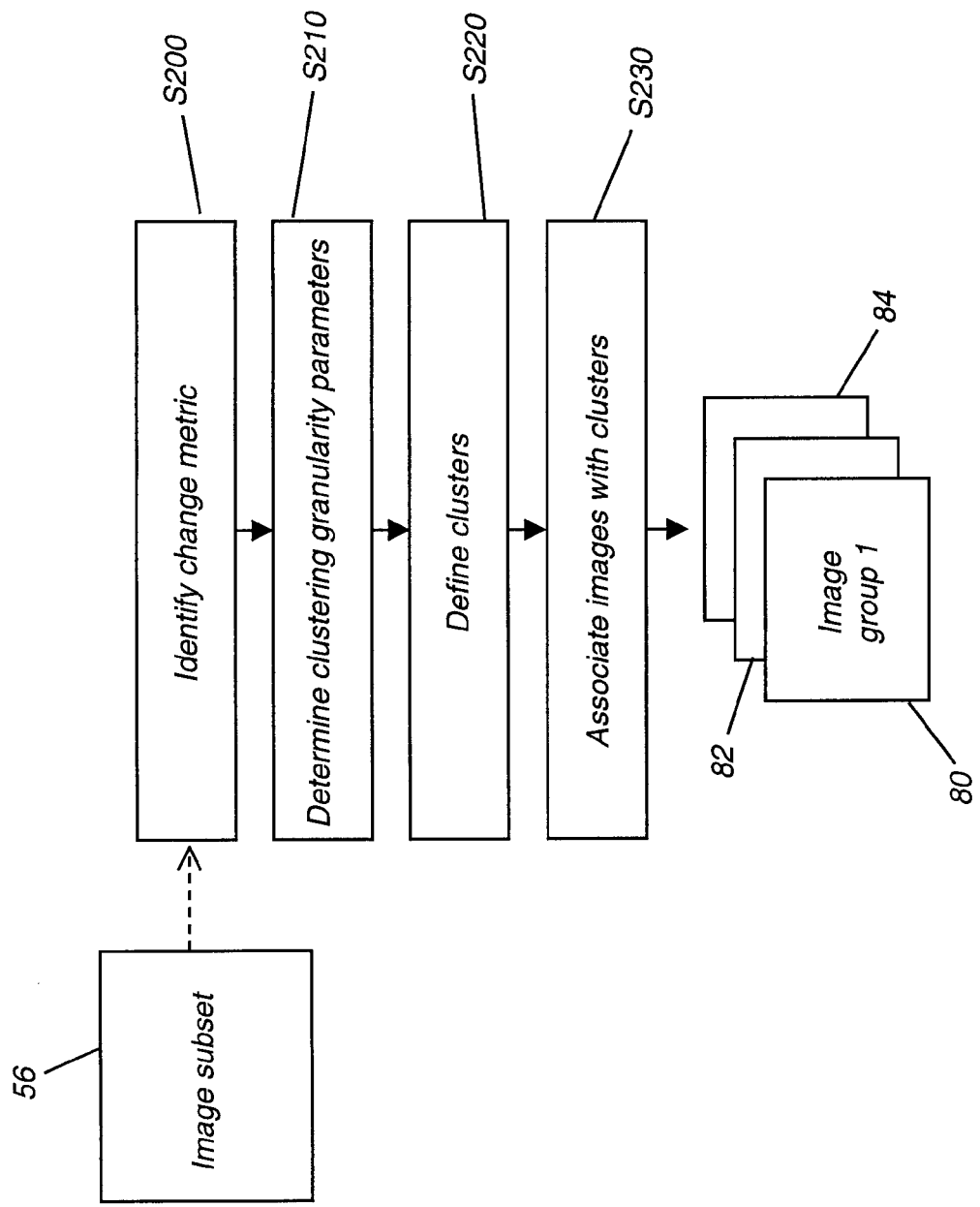
FIG. 8 is a logic flow diagram showing a sequence for providing image clustering, according to an embodiment of the present invention.

The sequence shown in FIG. 8 gives exemplary steps for clustering when using the change metric, according to an embodiment of the present invention. In a step S200, a change metric is identified. A clustering granularity setting is next obtained in a granularity determination step S210. Clustering granularity may be determined from a default value, from a profile value for a particular user or for particular types of image records, from operator input, from an algorithmic computation, or from some other source. Clusters, or groups, are then defined based on the specified change metric and clustering granularity, in a cluster definition step S220. Image records in at least some portion of image subset 56 can then be assigned to the defined clusters in an association step S230. In the example shown in FIG. 8, groups 80, 82, and 84 are formed as the result of clustering control logic.

It should be noted that clustering using a change metric could be used for some or all image records in a sampled subset as well as for multiple subsets or portions of multiple subsets. Moreover, clustering using the change metric could also be combined with one or more other types of clustering techniques, well known in the art, for clustering any portion(s) of the sampled subset of image records. For example, clustering techniques using the change metric could be applied to that portion of the image subset over which the change metric, or some related change metric, indicates the most pronounced level of change. Other portions of the sampled image subset could then be clustered using techniques that group by identifying events, subjects, colors, or other image features, or using metadata associated with the image records or semantic information available about the image records. Alternately, these other image records may simply be grouped together, not subject to further clustering operations. Additionally, it should be noted that successive clustering operations could also be executed on the sampled subset of image records. These might be used, for example, to further segment groups into subgroups or to refine subgroup boundaries. Change metric techniques could also be applied where successive clustering operations are used.

Figure 9:
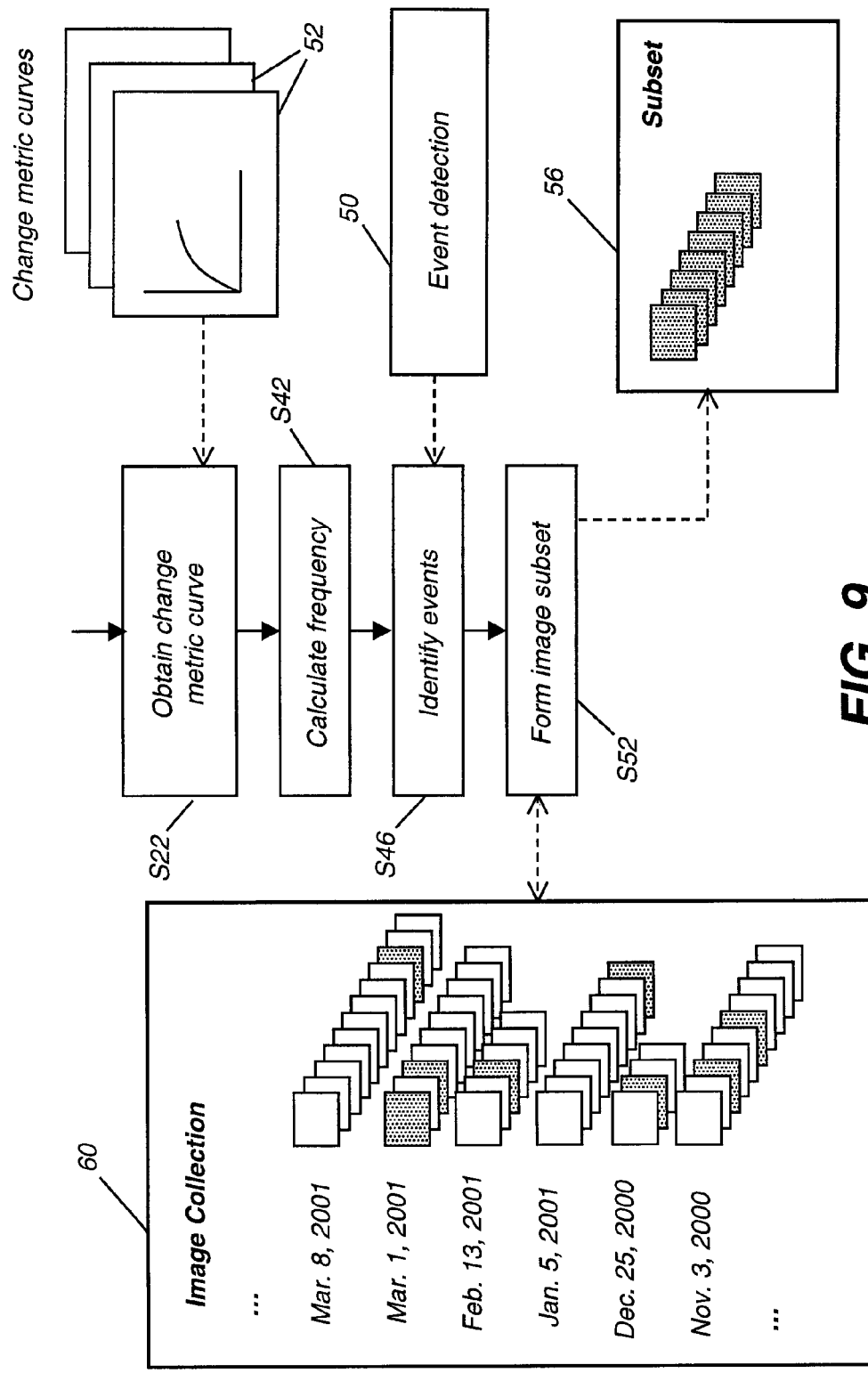
FIG. 9 is a logic flow diagram showing the process for forming an image subset using both change metrics and event grouping, according to an embodiment of the present invention.

The schematic diagram of FIG. 9 shows the sampling of image records from an image-record collection 60 using two different sampling techniques, according to an embodiment of the present invention. Step S22 obtains one of a possible set of desired change metric functions, shown as curves 52 in FIG. 9. As noted earlier, a suitable change metric can be generally specified in some embodiments based on characteristics of the image-record subject or subjects. One or more change metric functions can be stored on the data storage system 24, for example.

A calculate frequency step S42 then uses the characteristics of the selected change metric and granularity preferences provided, for example, from stored information on the system or from the user, in order to determine the relative frequency of the sampling operation. Event detection routines 50, using some method for event detection as described in patent literature cited earlier, may then used to identify events that can be used as factors for image sampling in addition to the change metric. A step S52 then forms an image subset 56 that contains the sampled image records obtained from image collection 60, using the combination of change metric- and event-based sampling. Subset 56 can then be further processed using the clustering logic shown in FIG. 8 or other suitable clustering process.

Saliency features and constraints may also be applied to the logic for either sampling or clustering when using a change metric. Saliency features include characteristics of image records that can be determined algorithmically from the image data itself. Both semantic saliency features and structural saliency features could be applied. The more complex semantic or "high-level" saliency features relate to the meaning of image content to an observer, and can also include characteristics such as location and relative size, for example. Low-level structural saliency features include image brightness, color, subject matter and other characteristics that can generally be determined without intensive computation. Commonly assigned U.S. Pat. No. 6,282,317, filed Dec. 31, 1998 by Luo et al., describes the use of semantic and structural saliency in combination.

The logic flow diagram of FIG. 10 shows one sequence for employing saliency features as factors for a sampling operation by a system, using any of the suitable processing components shown in FIG. 11, for example, such as processor 26. In a step S100, a user request for forming a sampled subset is accepted by the computer system 26. A spatio-temporal metric 62 is obtained, such as a place and time of image capture. A saliency feature appropriate to image records in image collection 60 is then determined in a step S110. Constraints are determined in an optional step S120. Constraints can include operator-entered or stored values that set various limits on characteristics such as number of image records to obtain, overall granularity settings, or other values. Image-record collection 60 can then be sampled in a sampling step 124 using a method of an embodiment of the present invention. In a step S130, the image-record count is reduced, such as by minimizing or eliminating image records that may appear to have very similar content, but retaining sufficient image records of the set to retain a sampling of the saliency feature throughout the sampled sequence. This reduction can be in addition to constraints specified for the sampling process in step 120. Sampled output, a subset 64, is provided in a step S130.

Any suitable sampling algorithm may be applied as part of sampling step 124, including the change metric sampling described with reference to FIGS. 6 and 7, for example. Other sampling algorithms could be applied in combination with, or separate from, change metric sampling as described herein. As one straightforward example of another sampling algorithm that might be appropriate, face detection software can be used to identify image records that contain the highest number of faces. Then, these image records would be selected as being of highest interest. Other examples of suitable methods for automating the task of obtaining the most suitable image from a grouping of image records are given in commonly assigned U.S. Pat. No. 6,847,733, entitled "Retrieval and browsing of database image records based on image emphasis and appeal" to Savakis et al., cited earlier.

Still other sampling techniques could use metrics such as the Image Value Index, described in commonly assigned U.S. patent application Ser. No. 11/403,686 to Fedorovskaya and Ser. No. 11/403,583 to Manico, both incorporated herein by reference.

EXAMPLE

The following example generally follows the logic flow sequences of FIGS. 7 and 10 to illustrate how image-record sampling may be carried out using an embodiment of the present invention in which saliency features also play a part. Petunia has an image storage account accessible from her home computer that includes numerous pictures of family members taken over the years. She now wants to prepare a virtual scrapbook of pictures of her son, Pomeroy. To begin this process, she enters a menu command to generate a subset of image records spanning the years of her son's life thus far. Pomeroy is a skateboard enthusiast, so Petunia specifies this as a saliency feature to be given a high value by the sampling algorithm. Constraints are presented by the medium Petunia chooses. She wants these pictures for display on her cellular phone so that she can readily display them to members of her gun club. In thus setting up the parameters for the sampling algorithm, Petunia has set up the following saliency features:
 Person: Pomeroy
 Subjects of special interest: Skateboarding, action shots
 Period span: Birthdate to the present date
 Other: Daylight
Her requirements have also provided the following parameters as constraints:
 Resolution suitable for display on hand-held device.
 No more than 40 pictures.

When setup is completed, Petunia enters a command to begin the sampling process. Software operating the computer system 26 may automatically sample pictures in the collection, using metadata corresponding to the image records. The software selects an appropriate sampling characteristic change metric curve from a number of curves available, based on the age and sex of the subject and other factors. Selection of this characteristic curve can be automatic or can be at the request of the user. Sampling frequency is algorithmically determined by the 40 picture constraint entered at the outset. Using a method according to an embodiment of the present invention, a combination of search criteria can be used, including both change metrics and event analysis in any appropriate order. It can be noted that other sampling techniques could be combined with change-metric sampling either in addition to, or as alternatives to, the event sampling steps described. This arrangement is advantageous for generating a subset of a collection of image records by sampling. Granularity can be adjusted by the user, based on user requirements and storage, display, or printing constraints. At the conclusion of the sampling process, the software presents her with a sampled subset of image records meeting her criteria.

The methods described above could be implemented on an entire imaging system (kiosk, Kodak Image Gallery, Kodak Easyshare, and EasyShare One camera). Image records and videos could be browsed, searched, and retrieved within or between components of the imaging system. The timeline sampling method could be used for image products such as a calendar, memory board, or scrapbook.

Preferred search criteria for a particular user could be learned by the system, allowing some amount of personalization or customization for each user. This could include learning user preferences for use of a characteristic change metric curve, subjects of interest, and other saliency features, as well as various constraints that have been applied.

Image records can be grouped in various ways to make them easier to retrieve depending on user and device characteristics. Semantic meaning could be assigned in the form of tags or text annotations which can be searched at a later date. This method could also be used to perform a "more like this" search to retrieve an image or video that was clustered within the same group. Image records can be grouped or sampled between and within groups for retrieval.

The invention has been described in detail with particular reference to certain preferred embodiments thereof, but it will be understood that variations and modifications can be effected within the scope of the invention. For example, while methods according to embodiments of the present invention have been described that obtain pictures of human subjects, these methods could alternately be applied to any subjects that undergo change at different rates and have a maturation-senescence sequence that might be of interest. For example, the subject selected could be a puppy or other pet, a new home under construction or a renovation project, a landscaping project, cultivated plant, hobby project, or some other creative endeavor.

PARTS LIST

10. Curve
12. Image Record
14, 16. Box
18. Image Record
22. System
24. Data Storage System
26. Computer System
28. User Interface System
30. Peripheral System
50. Event Detection Routines
52. Curve
56. Subset
60. Image Collection
62. Spatio-Temporal Metric
64. Subset
70, 72, 74. Grouping
78. Image
80, 82, 84. Group
90. Line
S10, S20, S30, S40, S44, S50. Steps
S22, S42, S46, S52. Steps
S100, S110, S120, S124, S130, S140, S150. Steps
S200, S210, S220, S230. Steps

The invention claimed is:

1. A method implemented at least in part by a computer system, the method for forming a subset of image records of a subject from at least a portion of an image collection based on growth of the subject, and the method comprising the steps of:
   identifying an image-record subject for a plurality of image records in the image collection, wherein the subject is a person;
   accessing a growth curve for a representative individual, wherein the growth curve represents age versus height;
   determining sampling frequencies based at least upon the growth curve;
   sampling at least a portion of the image collection using the sampling frequencies to obtain one or more image records for the subset of image records; and
   storing information pertaining to results of the sampling step in a computer-accessible memory system.

2. The method of claim 1, wherein the determining sampling frequencies step further includes using at least one different sampling criteria such as event classification.

3. The method of claim 2, wherein the sampling frequencies for a first portion of the image collection corresponding to a high slope region of the growth curve are determined based upon the growth curve of a representative individual and the sampling frequencies for a second portion of the image collection corresponding to a low slope region of the growth curve are determined by a different sampling criteria such as event classification.

4. The method of claim 3, wherein the sampling frequencies are determined as a function of the growth curve, event classification, and a sampling granularity factor.

5. The method of claim 2, further comprising the step of clustering image records in at least a portion of the subset of image records based upon the sampling frequencies.

6. The method of claim 5, wherein the clustering step uses a clustering granularity factor in addition to the sampling frequencies to cluster at least a portion of the subset of image records.

7. The method of claim 1, further comprising the step of clustering image records in at least a portion of the subset of image records based upon the sampling frequencies.

8. The method of claim 1, wherein the sampling frequencies are determined as a function of the growth curve and a sampling granularity factor.

* * * * *